United States Patent

Takahashi et al.

[11] Patent Number: 5,177,905
[45] Date of Patent: Jan. 12, 1993

[54] TOOL ATTACHING/DETACHING DEVICE

[75] Inventors: Shoji Takahashi; Kouichi Miyamoto, both of Tokyo, Japan

[73] Assignee: Ryobi Limited, Japan

[21] Appl. No.: 853,093

[22] Filed: Mar. 18, 1992

[30] Foreign Application Priority Data

Mar. 20, 1991 [JP] Japan .................. 3-16893[U]

[51] Int. Cl.⁵ .................................. B24B 41/04
[52] U.S. Cl. .................... 51/168; 51/170 PT
[58] Field of Search ............. 51/168, 209 R, 170 R, 51/170 PT, 170 T, 376, 377, 378; 403/24, 259; 83/666, 678; 279/75

[56] References Cited

U.S. PATENT DOCUMENTS

| | | | |
|---|---|---|---|
| 4,525,097 | 6/1985 | Ziegelmeyer | 403/259 |
| 4,850,154 | 7/1989 | Grammer et al. | 51/168 |
| 5,042,207 | 8/1991 | Kirn | 51/168 |

FOREIGN PATENT DOCUMENTS

| | | |
|---|---|---|
| 3012836 | 9/1985 | Fed. Rep. of Germany . |
| 2101513 | 3/1972 | France . |
| 0825877 | 12/1959 | United Kingdom . |
| 8805366 | 7/1988 | World Int. Prop. O. ............ 51/168 |

Primary Examiner—Roscoe V. Parker
Attorney, Agent, or Firm—Brooks & Kushman

[57] ABSTRACT

A tool attaching/detaching device is disclosed in which a tool depressing member is slidingly engaged with a body portion of a clamp nut, and balls are inserted into spaces defined between taper surface portions of the clamp nut and taper surface portions of the tool depressing member. A ring member is used to cover the spaces. An inner diameer of the ring member is changed along its inner circumferential surface.

5 Claims, 8 Drawing Sheets

-- PRIOR ART --

-- PRIOR ART --

TOOL ATTACHING/DETACHING DEVICE

BACKGROUND OF THE INVENTION

The present invention relates to a tool attaching/detaching device, and more particularly to an attaching/detaching device for attaching/detaching a circular tool such as a grindstone for a grinder without using any other auxiliary tool.

In general, a working machine such as a grinder which performs working by rotating a tool is well known. In such a device, a rotary tool is mounted thereon by an attaching/detaching mechanism.

FIG. 7 is a cross sectional view showing a recently proposed attaching/detaching device, and FIG. 8 is a sectional view taken along the line VIII—VIII of FIG. 7 (Japanese Publication of International Application No. Hei 2-502359). Three radially extending pins 102, 102, 102 are embedded in a ring member 101 so as to extend radially inwardly. Three support members 103 are interposed within the ring member while keeping a space therebetween. Stoppers 105 are provided at suitable positions within the space 104. A coil spring 106 is interposed between each stopper 105 and the associated radial pin 102. Each ball 107 is rotatably disposed opposite to the radial pin 102 and the stopper 105. A recess 101a which is engageable with the ball 107 is formed in an inner surface of the ring member 101. A clamp nut 108 is threadedly engageable with a spindle 109 is inserted into the inner portion of the support members 103. As shown in FIG. 8, a slide member 110 is slidingly provided around a body portion 108a of the clamp nut 108. The slide member 110 is in contact with a rotary tool 111 and is adapted to clamp the rotary tool 111 in cooperation with an inner flanged portion of a gear shaft 112.

The operation for mounting the attaching/detaching device onto the spindle 109 will be explained.

First of all, the body portion 108a of the clamp nut 108 is engaged with the spindle 109 to thereby threadedly advance the clamp nut 108 and the ring member 101 is rotated to locate the balls 107 in the position shown in FIG. 7. Then, as shown in FIG. 8, the slide member 110 is stopped at a position in contact with the rotary tool 111 to thereby perform temporary fastening. Subsequently, a motor (not shown) is operated so that the spindle 109 is rotated. In this case, since the spindle 109 is rotated in a direction in which the clamp nut 108 is fastened, the fastening is assured to complete the mounting operation of the rotary tool 111. When the device is loosened, the balls 107 are located in the recesses.

In such an arrangement, since the balls are only located in two positions, that is, the position where the balls are in contact with the pins 102 and the position where the balls are located in the recesses 101a, it is impossible to manually fasten the device completely and it is necessary to use the fastening torque of the motor to rotate the spindle 109. On the other hand, such an arrangement needs the increased number of the mechanical parts for depressing the slide member and the clamp nut through the support members. This leads to difficulty in machining the mechanical parts.

SUMMARY OF THE INVENTION

In view of the foregoing difficulties, an object of the invention is to provide a tool attaching/detaching device which may be manually sufficiently fastened and those number of mechanical parts may be reduced.

According to the present invention, there is provided a tool attaching/detaching device comprising: a tool mounting portion having a screw portion or fastening a rotary tool onto a tip end portion of a spindle; a flange member provided on the tool mounting portion for receiving the rotary tool; and a fastening means for fastening and fixing the rotary tool relative to the flange member, the fastening means including: a clamp member threadedly engaged with the tool mounting portion and having a flanged portion provided with a taper surface portion and a body portion having a screw portion threadedly engageable with the screw portion of the tool mounting portion, the flanged portion and the body portion being formed integrally with each other; a tool depressing member having a taper surface portion facing the taper surface portion of the flanged portion; a ring-shaped rotary operational member for covering a space defined by the tool depressing member and the flanged portion, the ring-shaped rotary operational member having, on its inner circumferential surface, a plurality of projections extending radially inwardly, the inner circumferential surface between the adjacent projections being formed so that an inner diameter is changed; and balls each of which is in contact with the taper surface portion of the tool depressing member and the inner circumferential surface of the rotary operational member and is normally depressed by spring means so that the ball is located at a position where the inner diameter of the inner circumferential surface of the rotary operational member is kept at a maximum length; wherein when the tool is fastened to the spindle, the ball clamped by the taper surface portion of the flanged portion and the taper surface portion of the tool depressing member is moved radially inwardly by the change in diameter of the inner circumferential surface of the rotary operational member, so that the tool depressing member is slidingly moved in a direction in which the tool depressing member depresses the tool.

According to the invention, by manually rotating the rotary operational member, the clamp member is threadedly advanced along the spindle. Then, the tool depressing member is brought into contact with the tool. Thus, the balls are kept under the condition that balls are clamped by the clamp member and the tool depressing member. Under this condition, when the rotary operational member is further rotated, in accordance with the change in diameter of the inner circumferential surface of the ring, the balls are moved radially inwardly while separating the flanged portion of the clamp member and the tool depressing member. In this case, since the tool depressing member is moved toward the tool, the tool depressing member depresses the tool with a stronger force to thereby complete the fastening operation.

PREFERRED EMBODIMENTS OF THE INVENTION;

One embodiment of the invention will now be described with reference to the accompanying drawings.

Figure 1:
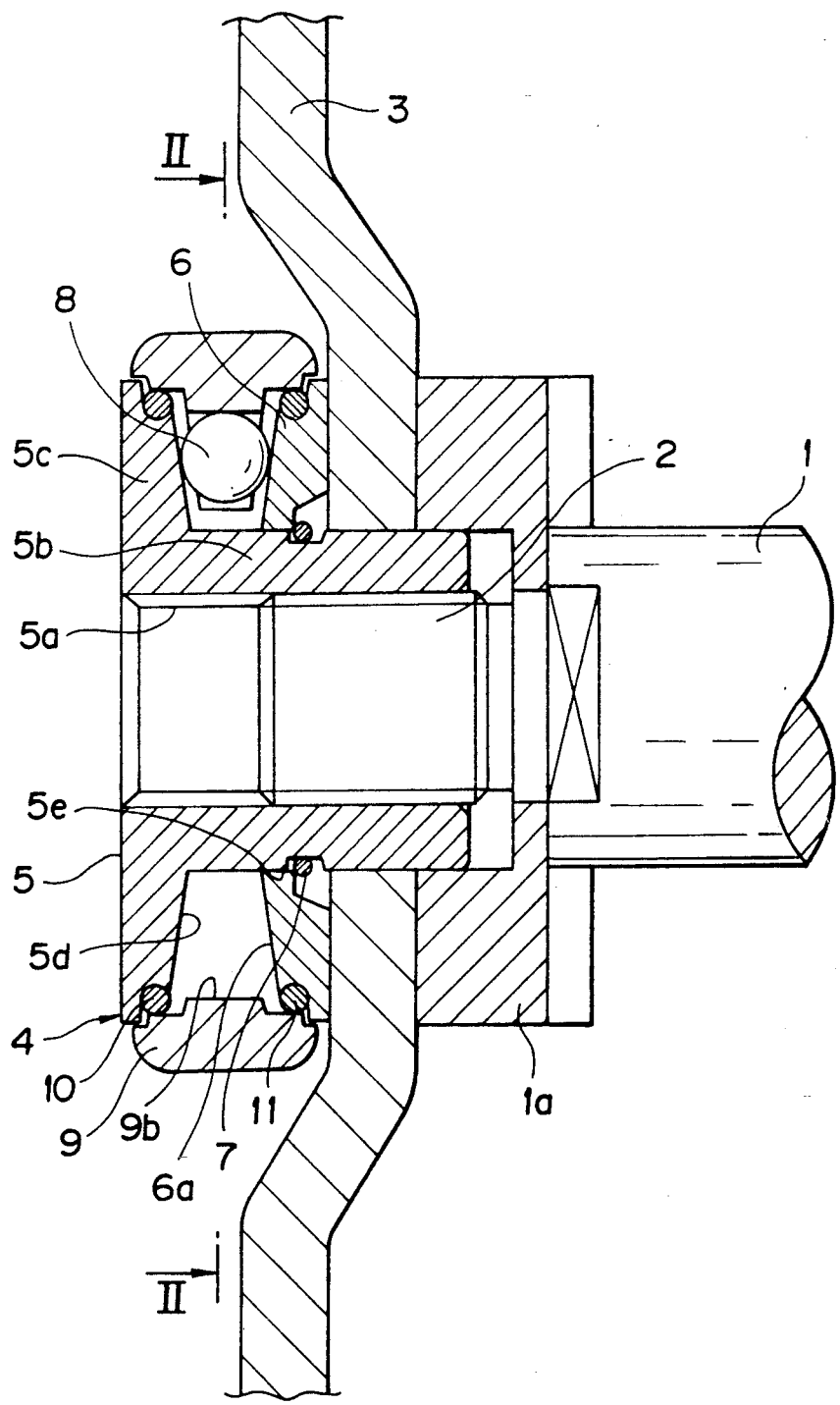
FIG. 1 is a sectional view showing a tool attaching/detaching device according to the invention.
Figure 2:
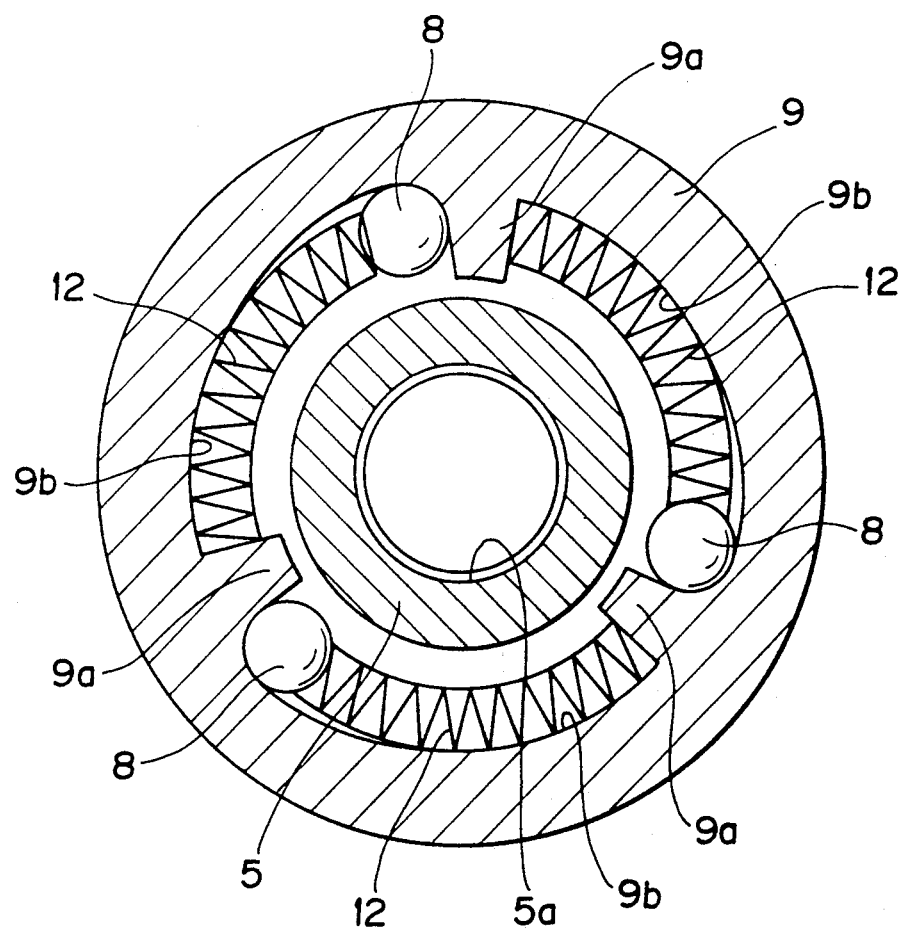
FIG. 2 is a cross sectional view taken along the line II—II of FIG. 1.

FIG. 1 is a cross sectional view showing a tool attaching/detaching device according to the invention. FIG. 2 is a sectional view taken along the line II—II of FIG. 1. A spindle 2 with a screw portion is mounted at an end portion of a gear shaft 1. The spindle 2 forms a tool mounting portion. An inner flanged portion 1a is fixed to an end portion of the gear shaft 1. One end face of a rotary tool 3 is in contact with the inner flange member 1a. A fastening body is in turn in contact with the other face of the rotary tool 3. The fastening body 4 has a clamp nut 5 which is composed of a body portion 5b having a screw portion 5a and a flanged portion 5c formed at an end portion of the body portion 5b. A tapered portion 5d is formed at a right portion (FIG. 1) of the flanged portion 5c. A tool depressing member 6 which is in the form of a ring and which is slidable is disposed around an outer peripheral surface of the body portion 5b. The tool depressing member 6 is prevented from falling away from the body portion 5b by a C ring 7 engaged with a circumferential groove 5e formed in the outer peripheral portion of the body portion 5b. A taper surface portion 6a is formed on a side, confronting with the taper surface portion 5d, of the tool depressing member 6 (on the left side of FIG. 1). Three balls 8 are disposed between the taper surface portion 5d of the clamp nut 5 and the taper surface portion 6a of the tool depressing member 6 (see FIG. 2). The balls 8 are retained by a ring member 9 which serves as a rotary operational member so that the balls are prevented from falling away from the spaces. The fastening body 4 comprises the clamp nut 5, the tool depressing member 6, the balls 8, the ring member 9, etc.. The ring member 9 is disposed around the flanged portion 5c of the clamp nut 5 and the outer peripheral portion of the tool depressing member 6 through 0 rings 10 and 11. As shown in FIG. 2, three projections as stoppers 9a are provided so as to extend radially inwardly of the inner peripheral portion of the ring member 9. The ball 8 and a spring 12 for depressing the ball 8 against the stopper 9a are provided between the adjacent stoppers 9a. The inner peripheral surface 9b of the ring member 9 is in the form of an arcuate shape which is changed in inner diameter between the adjacent stoppers 9a. Then, the ball 8 is depressed by the spring 12, and its diameter is kept at maximum at a position where the ball 8 is brought into contact with the stopper 9a (see the end in the clockwise direction in FIG. 2).

The operation of the thus constructed attaching-/detaching device will be explained.

The screw portion 5a of the clamp nut 5 is threadedly engaged with the spindle 2 so that the fastening body 4 is advanced in the right direction in FIG. 1. At this time, the tool depressing member 6 is brought into contact with the rotary tool 3. During this advancement, the ball 8 is located so that the stopper 9a is depressed by the spring 12. When the tool depressing member 6 is brought into contact with the rotary tool 3, the threaded engagement of the clamp nut 5 is completed. In this case, the ball 8 is kept under the condition that the ball 8 is clamped between the taper surface portion of the flanged portion 5c of the clamp nut 5 and the taper surface portion 6a of the tool depressing member 6. Under this condition, the ring member 9 is further rotated in the clockwise direction in FIG. 2 against the biasing force of the spring 12. In this case, since the ball 8 is clamped between the flanged portion 5c and the taper surface portions 6a of the tool depressing member 6, the ball 8 is not moved together with the ring member 9 and only the ring member 9 is rotated. Then, the ball 8 is moved radially inwardly in accordance with the change of the inner diameter of the inner circumferential surface 9b of the ring member 9. Furthermore, in accordance with this radially inward movement, the tool depressing member 6 is moved in a direction in which the tool depressing member 6 is away from the flanged portion 5c of the clamp nut 5 (i.e., in the right direction in FIG. 1). The interval between the tool depressing member 6 and the inner flange member 1a so that the rotary tool 3 is firmly depressed to thereby complete the fastening operation of the rotary tool 3.

Figure 3:
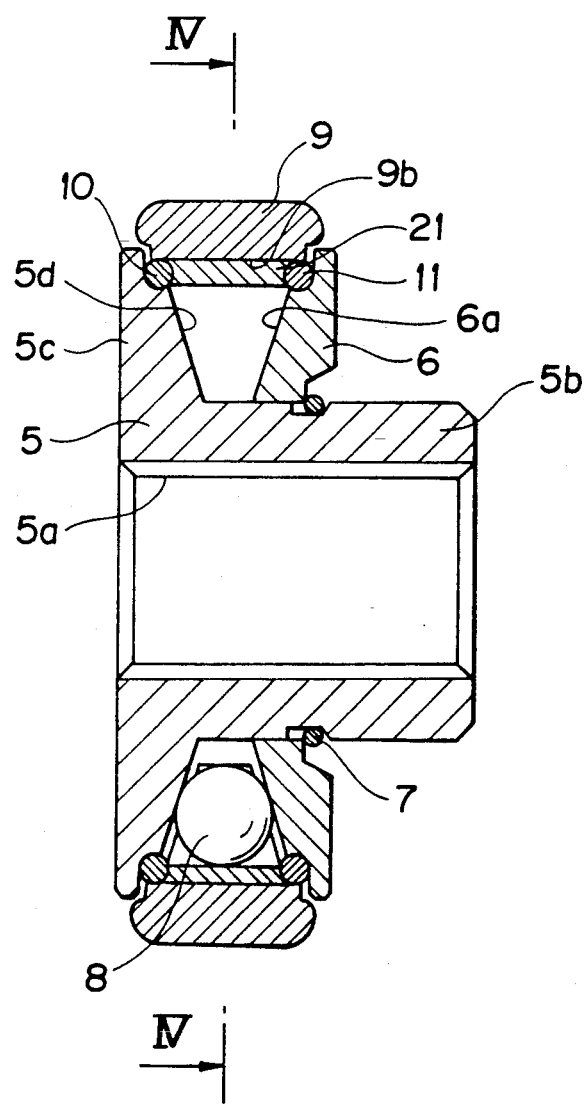
FIG. 3 is a sectional view showing a tool attaching/detaching device according to another embodiment of the invention.
Figure 4:
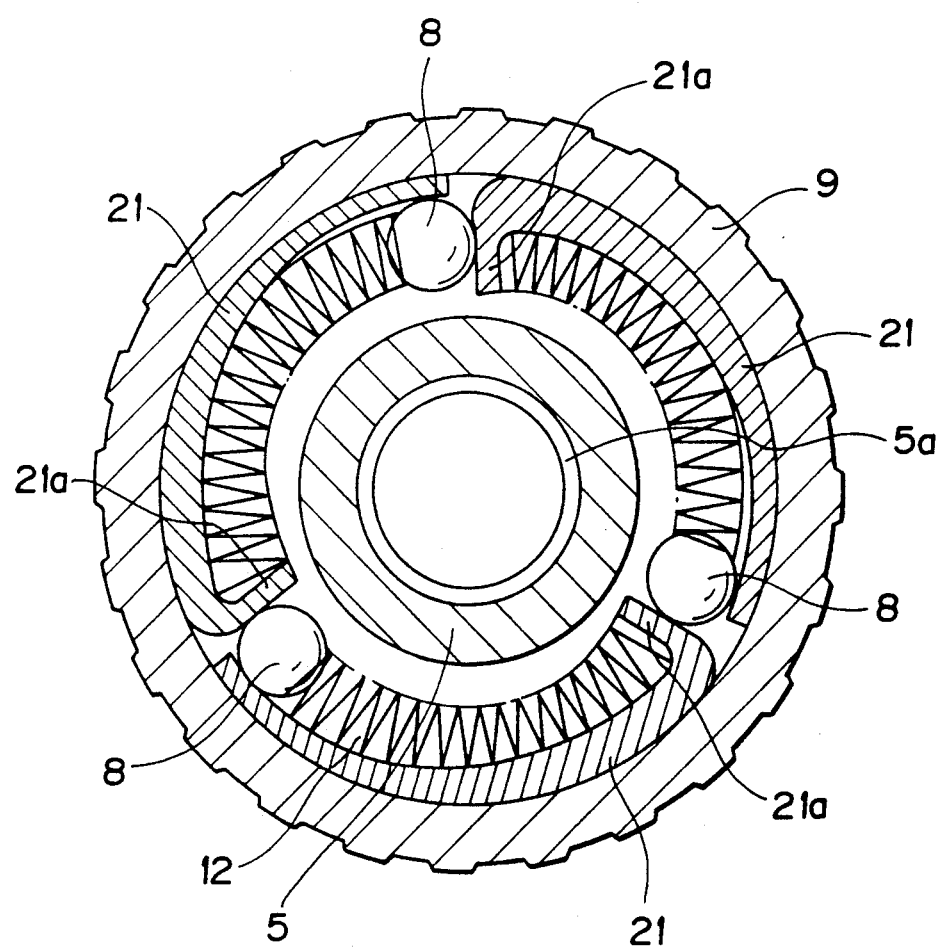
FIG. 4 is a cross sectional view taken along the line IV—IV of FIG. 3.

FIG. 3 is a cross sectional view showing an attaching-/detaching device according to a second embodiment of the invention. FIG. 4 is a sectional view taken along the line IV—IV of FIG. 3. In the second embodiment, the same reference numerals are used to indicate the like member or component and detailed explanation therefor will be omitted.

In the second embodiment, the inner diameter of the inner peripheral surface 9b of the ring member 9 is kept unchanged. Three arcuate plate members 21, 21, 21 each having radially inwardly extending projection 21a are provided at the inner peripheral surface 9b of a ring member 9. In this case, the plate members 21 are constructed so that their thickness is gradually decreased from the ends of the projections 21a. The balls 8 and the springs 12 for depressing the balls 8 toward the projections 21a (i.e., in the clockwise direction in FIG. 4) are provided between the projections 21a of the adjacent plate members 21. In other words, in the second embodiment, although the ring is composed of the ring member 9 and the plate members 21 so that an additional work to mount the plate members 21 onto the ring member 9 is additionally required, it is advantageous that it is easy to manufacture the ring member 9 and the plate members 21. In particular, since the balls 8 roll around the inner peripheral surface of the ring, a rather strong mechanism is required. Accordingly, a thermal treatment is applied to the part. However, if the ring is composed of the ring member 9 and the plate members 21, it is advantageous that the heat treatment is satisfactorily applied only to the plate members 21.

Figure 5:
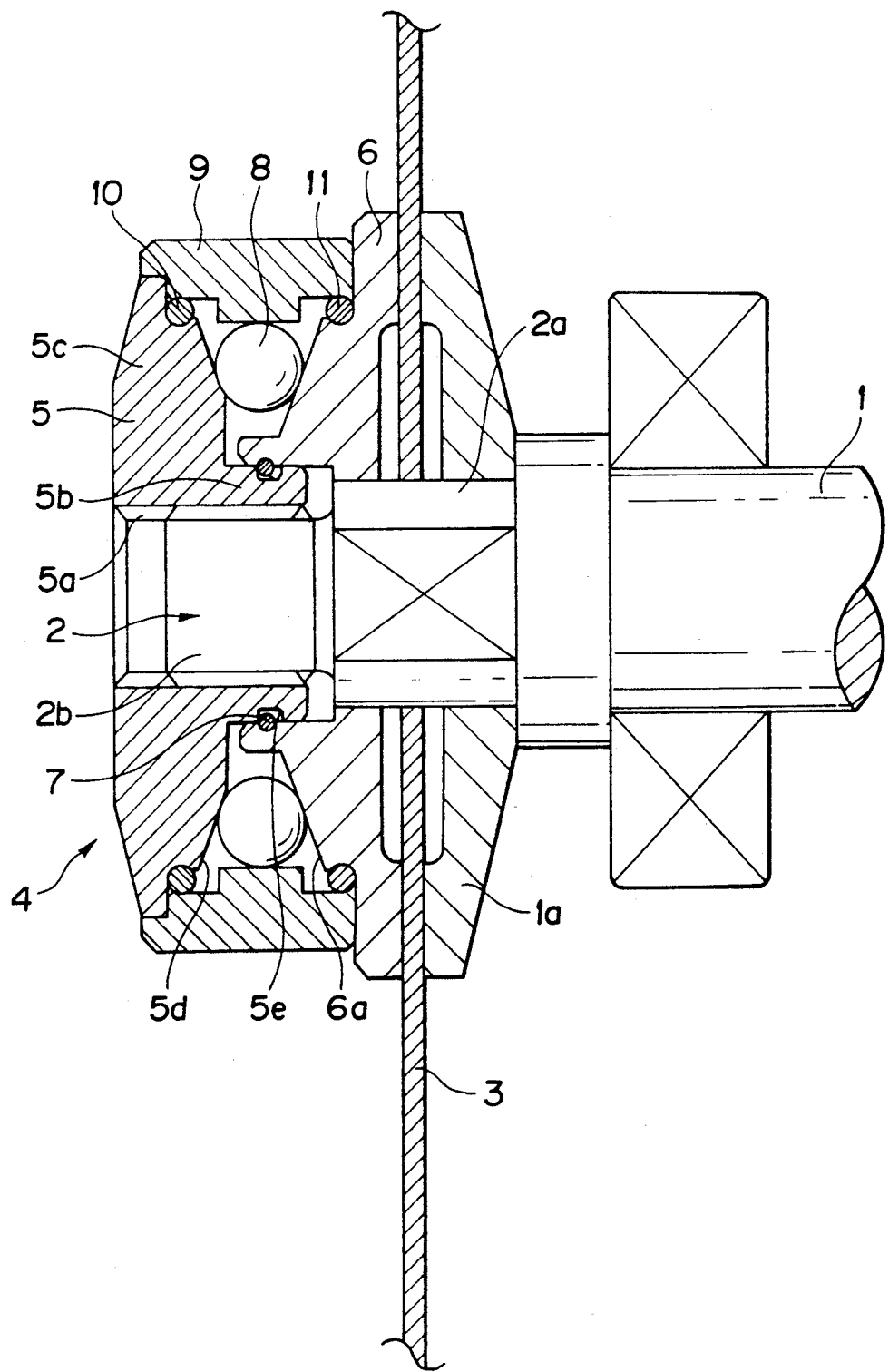
FIG. 5 is a sectional view showing a tool attaching-/detaching device according to still another embodiment of the invention.

FIG. 5 is a cross sectional view of an attaching-/detaching device in accordance with a third embodiment. With respect to the third embodiment, the same reference numerals are used to indicate the same members and components as those of the second embodiment. Although the first and second embodiments relate to a grinder, the third embodiment is related to application to a circular saw. In the third embodiment, the spindle 2 has an engaging portion 2a which is provided with flat surfaces. The engaging portion 2a supports the inner flanged portion 1a at its root portion and the tool depressing member 6 at its front end adjacent a screw portion 2b which engages with the screw portion 5a of the clamp nut 5. Therefore, the tool depressing member 6 is not rotated together with the clamp nut 5 when the fastening body 4 is operated.

Figure 6:
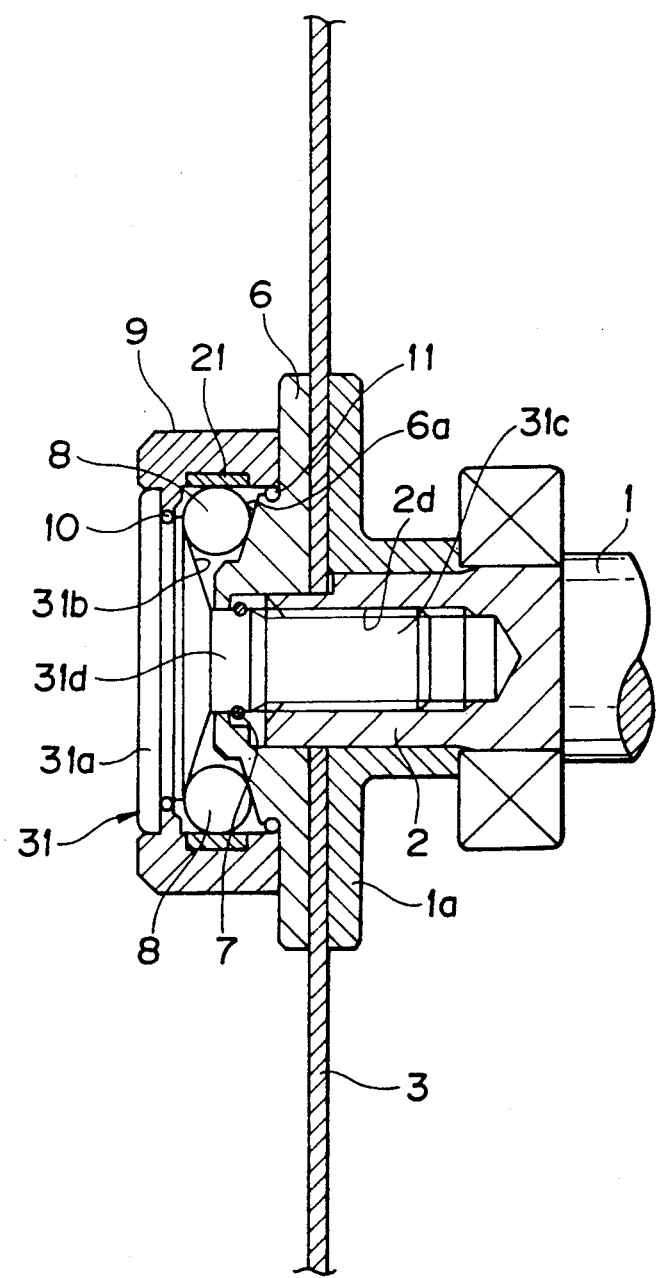
FIG. 6 is a sectional view showing still another embodiment of the invention.
Figure 7:
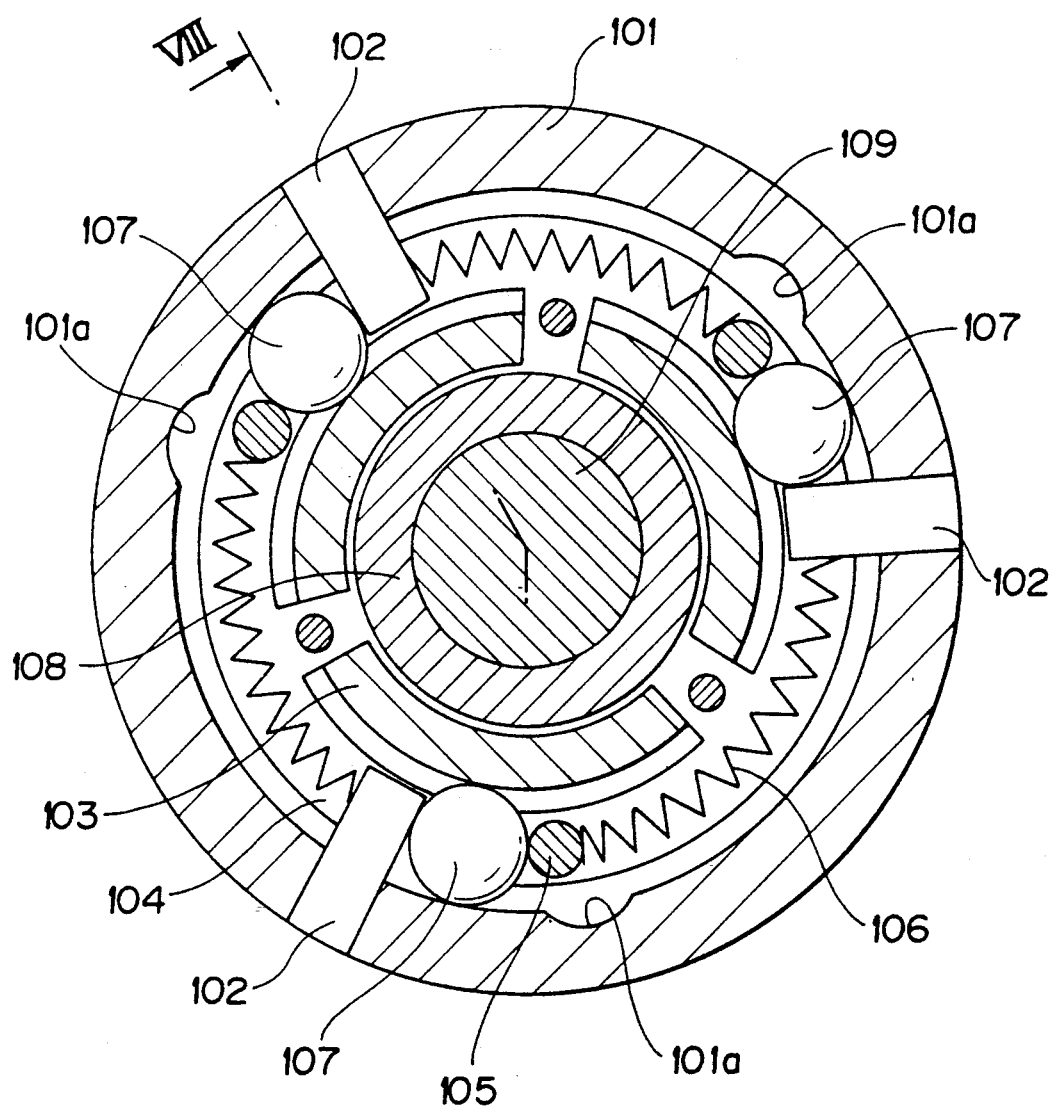
FIG. 7 is a cross sectional view showing a tool attaching/detaching device according to the prior art.
Figure 8:
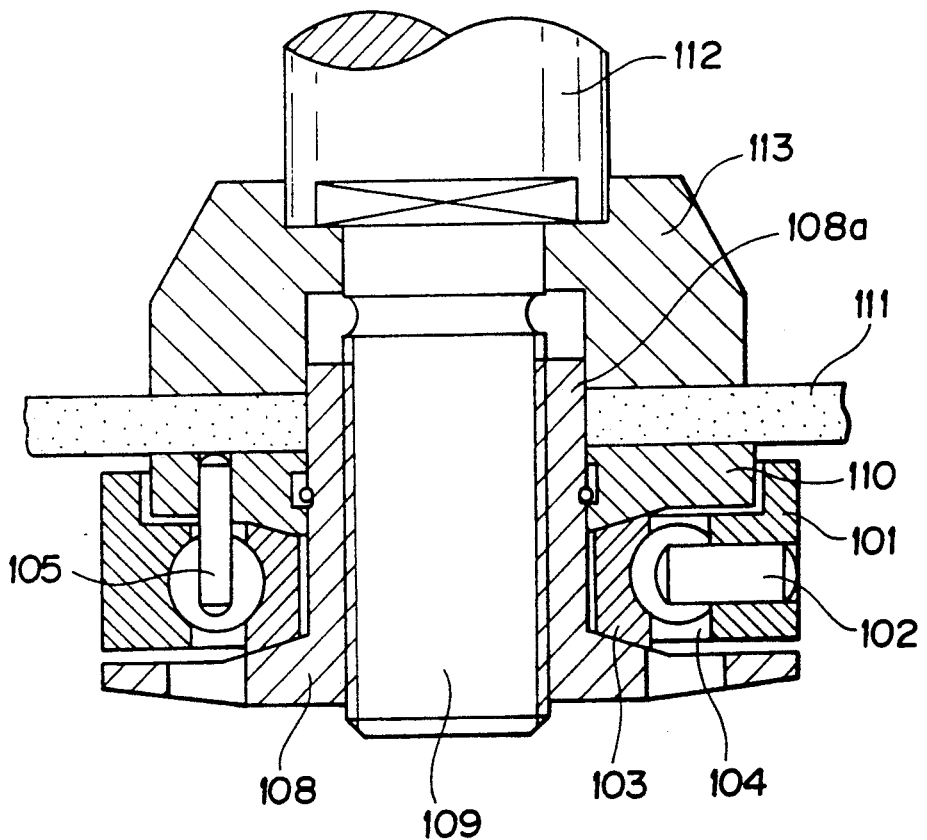
FIG. 8 is a sectional view showing the device taken along the line VIII—VIII of FIG. 7.

FIG. 6 is a cross sectional view showing an attaching-/detaching device in accordance with a fourth embodiment of the invention. Also in this embodiment, the same reference numerals are used to indicate the like members or components.

In the fourth embodiment, a clamp bolt 31 is used as a clamp member. A taper surface portion 31b is formed on a head portion 31a as a flanged portion of the clamp bolt 31, and a screw portion 31c is applied only to a tip end portion of a shaft portion 31d as a body portion. No screw portion is formed in a part of the shaft portion 31d on the side of the head portion 31a. The tool depressing member 6 is slidably provided. The screw portion 31c is engaged with a screw portion 2d formed in the spindle 2. The tool 3 is supported on the outer peripheral surface of the spindle 2.

With the above described arrangement according to the invention, it is unnecessary to effect the fastening operation using the motor. It is possible to manually perform the fastening operation. Also, it is possible to reduce the number of the mechanical parts. The operationability or maneuverability is enhanced. Also, in the case where the ring is composed of the ring member and the plate members, it is easy to manufacture the device, so that it is possible to reduce the cost for the device.

What is claimed is:

1. A tool attaching/detaching device comprising:
    a tool mounting portion having a screw portion for fastening a rotary tool onto a tip end portion of a spindle;
    a flange member provided on said tool mounting portion for receiving said rotary tool; and
    a fastening means for fastening and fixing said rotary tool relative to said flange member;
    said fastening means including:
        a clamp member threadedly engaged with the tool mounting portion and having a flanged portion provided with a taper surface portion and a body portion having a screw portion threadedly engageable with the screw portion of said tool mounting portion, said flanged portion and said body portion being formed integrally with each other;
        a tool depressing member having a taper surface portion facing the taper surface portion of said flanged portion;
        a ring-shaped rotary operational member for covering a space defined by said tool depressing member and said flanged portion, said ring-shaped rotary operational member having, on its inner circumferential surface, a plurality of projections extending radially inwardly, the inner circumferential surface between the adjacent projections being formed so that an inner diameter is changed; and
        balls each of which is in contact with the taper surface portion of said tool depressing member and the inner circumferential surface of said rotary operational member and is normally depressed by spring means so that the ball is located at a position where the inner diameter of the inner circumferential surface of said rotary operational member is kept at a maximum length;
        wherein when said tool is fastened to said spindle, the ball clamped by the taper surface portion of said flanged portion and the taper surface portion of said tool depressing member is moved radially inwardly by the change in diameter of the inner circumferential surface of said rotary operational member, so that the tool depressing member is slidingly moved in a direction in which the tool depressing member depresses said tool.

2. The device according to claim 1, wherein said plurality of projections are formed integrally with the inner wall of said ring-shaped rotary operation member and said inner circumferential surface of the ring-shaped rotary operational member is in an arcuate form which is changed in inner diameter between two projections.

3. The device according to claim 1, wherein each of said plurality of projections is formed at one end of an arcuate plate member which is provided on a inner circumferential surface of the ring-shaped rotary operational member, said arcuate plate member being formed so that its thickness is gradually decreased from an end on projection side, said spring means and said ball being disposed between two projections of the adjacent arcuate plate members.

4. The device according to claim 1, wherein said tool mounting portion has an engaging portion with flat surfaces for supporting said tool depressing member with the tool in non-rotated state and a screw portion for engaging with said clamp member.

5. The device according to claim 1, wherein said clamp member comprises a clamp bolt which has a head portion as said flanged portion and a shaft as said body portion, said shaft being provided with a screw portion which is engaged with a screw portion formed in the spindle.

* * * * *